(12) United States Patent (10) Patent No.: US 9,426,859 B2
Chen et al. (45) Date of Patent: Aug. 23, 2016

(54) DRIVING DEVICE FOR LED AND THE DRIVING METHOD THEREOF

(71) Applicant: SHENZHEN SENDIS SEMICONDUCTOR CO.,LTD, Shenzhen (CN)

(72) Inventors: Xiaoyu Chen, Shenzhen Guandong (CN); Bo Chen, Guangdong (CN); Xunsheng Deng, Guandong (CN); Jing Zhang, Guandong (CN); Yanquan Mai, Guandong (CN)

( * ) Notice: Subject to any disclaimer, the term of this patent is extended or adjusted under 35 U.S.C. 154(b) by 0 days.

(21) Appl. No.: 14/666,368

(22) PCT Filed: Jul. 8, 2013

(86) PCT No.: PCT/CN2013/078967
§ 371 (c)(1),
(2) Date: Mar. 24, 2015

(87) PCT Pub. No.: WO2014/048157
PCT Pub. Date: Apr. 3, 2014

(65) Prior Publication Data
US 2016/0037592 A1 Feb. 4, 2016

(30) Foreign Application Priority Data
Sep. 26, 2012 (CH) .......................... 201210362539

(51) Int. Cl.
*H05B 33/08* (2006.01)

(52) U.S. Cl.
CPC .......... *H05B 33/083* (2013.01); *H05B 33/0809* (2013.01); *H05B 33/0824* (2013.01); *H05B 33/0887* (2013.01); *Y02B 20/348* (2013.01)

(58) Field of Classification Search
CPC ............. H05B 33/083; H05B 33/0803; H05B 33/0815; H05B 33/089; H05B 33/0821; H05B 33/0827; H05B 33/0845; H05B 33/0809
See application file for complete search history.

(56) References Cited

U.S. PATENT DOCUMENTS

| | | | | |
|---|---|---|---|---|
| 2010/0308738 | A1* | 12/2010 | Shteynberg | H05B 33/0812 315/185 R |
| 2011/0068702 | A1* | 3/2011 | van de Ven | H05B 33/083 315/186 |
| 2012/0299492 | A1* | 11/2012 | Egawa | H05B 33/083 315/192 |
| 2015/0216001 | A1* | 7/2015 | Mok | H05B 33/083 315/192 |
| 2015/0382420 | A1* | 12/2015 | Sakai | H05B 33/0803 315/193 |

* cited by examiner

*Primary Examiner* — Jany Richardson
(74) *Attorney, Agent, or Firm* — James M. Smedley LLC; James Michael Smedley, Esq.

(57) ABSTRACT

The present invention discloses a driving device for LED and the driving method thereof, includes: a bridge rectifier, at least one LED-lamp bunch and LED-lamp group and P-type switching module and N-type driving module, and a logic controller; the LED-lamp bunch and group are connected orderly in series; the bridge rectifier's positive end connects to the LED-lamp bunch's anode, while a negative end gets grounded; the logic controller connects to the anode and cathode of LED-lamp bunch through the P-type switching module respectively, the cathode of LED-lamp group through N-type driving module, and the negative input end of the bridge rectifier; by controlling the N-type driving module and P-type switching module makes the number of lit-on LED-lamps change following the rectified input signal voltage changes; thus its efficiency is improved and easy to be integrated into chips.

7 Claims, 4 Drawing Sheets

DRIVING DEVICE FOR LED AND THE DRIVING METHOD THEREOF

FIELD OF THE INVENTION

The present invention relates to the field of technologies on LED (Light Emitting Diode) illuminations, and more particularly, to a driving device for LED and the driving method thereof.

CROSS REFERENCE TO RELATED APPLICATIONS

The present application claims the benefit of International Application No. PCT/CN2013/078967, filed Jul. 8, 2013, which claims benefit to Chinese Patent Application No. 201210362539.2, filed Sep. 26, 2012. The entire disclosures of both applications are incorporated herein by reference.

BACKGROUND

Currently, concerns on global energy shortage rise again, and how to save energy becomes an important issue we are facing in the future. In illumination field, LED lighting, as a revolutionary energy-saving illumination technology, is booming. LED-lamps, as a new type of green lighting product, are energy-saving and environmental friendly, which must be the future development trend, and the twenty-first century will enter an era of adopting new illumination sources, represented by LED lighting. However, LED driving technologies are securities to the development of LED industry chain.

In current technologies, the adopted LED driving method is converting AC (Alternating Current) to DC (Direct Current) before driving an LED. However, this driving method requires electric parts including electric conductors and electrolytic capacitors, wherein, the usage life of an electrolytic capacitor is relatively short, which has seriously hampered the whole life of an LED driving circuit. The method of adopting the above mentioned driving circuit for LED, owns not only a relatively high cost, but a low converting efficiency, around 80% generally, which has seriously hampered the energy saving and illumination effects of LED lighting, lowered the stability of the whole system, and obstructed large-scale applications of LED lighting.

Therefore, the prior art needs to be improved and developed.

BRIEF SUMMARY OF THE DISCLOSURE

The technical problem to be solved in the present invention, aiming at the defects of the prior art, provides a new driving device for LED and the driving method thereof, in order to solve the problems in the prior art, include, short usage life, low efficiency and relatively low stability, so as to achieve the aims of extending usage life of the product, increasing the driving efficiency, saving the cost, and improving the stability of the whole system.
In order to achieve the above said targets, the technical solution of the present invention is as follows:
A driving device for LED, wherein, it includes: a bridge rectifier, applied to rectify input signals; at least one LED-lamp bunch, at least one LED-lamp group, at least one P-type switching module, applied to drive the said LED-lamp bunch, at least one N-type driving module, applied to drive the said LED-lamp group, and a logic controller, applied to control the said P-type switching module and N-type driving module; wherein, the number of the said LED-lamp bunches is the same as that of the said P-type LED-lamp switching modules; while the number of the said LED-lamp groups is the same as that of the said N-type LED-lamp driving modules; the said LED-lamp bunch connects to the said LED-lamp group in serial; an anode of the said LED-lamp bunch connects to a positive output end of the said bridge rectifier, while a negative output end of the said bridge rectifier gets grounded; a cathode of the said LED-lamp bunch connects to the anode of the said LED-lamp group; the said logic controller connects to the anode and cathode of the said LED-lamp bunch, respectively, through the said P-type switching module; and the said logic controller connects to the cathode of the LED-lamp group, through the said N-type driving module; while the said logic controller also connects to a negative input end of the said bridge rectifier.

The said driving device for LED, wherein, the said LED-lamp bunch and LED-lamp group include at least one LED or HV LED (High Voltage Light Emitting Diode), respectively.

The said driving device for LED, wherein, the said driving device for LED includes:
2 LED-lamp bunches, that is, a first LED-lamp bunch and a second LED-lamp bunch, respectively;
2 P-type switching modules, that is, a first P-type switching module and a second P-type switching module, respectively;
4 LED-lamp groups, that is, a first LED-lamp group, a second LED-lamp group, a third LED-lamp group and a fourth LED-lamp group, respectively;
4 N-type driving modules, that is, a first N-type driving module, a second N-type driving module, a third N-type driving module and a fourth N-type driving module, respectively;
the said first LED-lamp bunch, second LED-lamp bunch, first LED-lamp group, second LED-lamp group, third LED-lamp group and fourth LED-lamp group are connecting one by one in the sequence; the anode of the said first LED-lamp bunch connects to the positive output end of the said bridge rectifier, while the negative output end of the said bridge rectifier gets grounded; the said logic controller connects to both the anode and cathode of the said first LED-lamp bunch, through the said first P-type switching module, respectively; the cathode of the said first LED-lamp bunch connects to the anode of the said second LED-lamp bunch; the said logic controller connects to both the anode and cathode of the said second LED-lamp bunch, through the said second P-type switching module, respectively; the cathode of the said second LED-lamp bunch connects to the anode of the said first LED-lamp group; the cathode of the said first LED-lamp group connects to the anode of the said second LED-lamp group; the said logic controller connects to the cathode of the said first LED-lamp group, through the said first N-type driving module; the cathode of the said second LED-lamp group connects to the anode of the said third LED-lamp group; the said logic controller connects to the cathode of the said second LED-lamp group, through the said second N-type driving module; the cathode of the said third LED-lamp group connects to the anode of the said fourth LED-lamp group; the said logic controller connects to the cathode of the said third LED-lamp group, through the said third N-type driving module; the said logic controller connects to the cathode of the said fourth LED-lamp group, through the said fourth N-type driving module.

The said driving device for LED, wherein, the said first N-type driving module includes a first NMOS FET (N-Mental-Oxide-Semiconductor Field Effect Transistor), a first resistor, a first comparator, and a second comparator; a drain electrode of the said first NMOS FET connects to the cathode of the first LED-lamp group and the anode of the second LED-lamp group; a gate electrode of the said first NMOS FET connects to the logic controller; a source electrode of the said first NMOS FET gets grounded through the first resistor, while it also connects to in-phase input ends of both the first comparator and the second comparator; a inverting input end of the said first comparator connects to a first reference voltage, and the output end connects to the logic controller; the inverting input end of the said second comparator connects to a second reference voltage, and the output end connects to the logic controller;

the said second N-type driving module includes a second NMOS FET, a second resistor, a third comparator, and a fourth comparator; the drain electrode of the said second NMOS FET connects to the cathode of the second LED-lamp group and the anode of the third LED-lamp group; the gate electrode of the said second NMOS FET connects to the logic controller; the source electrode of the said second NMOS FET gets grounded through the second resistor, while it also connects to the in-phase input ends of both the third and fourth comparators; the inverting input end of the said third comparator connects to the first reference voltage, and the output end connects to the logic controller; the inverting input end of the said fourth comparator connects to the second reference voltage, while the output end connects to the logic controller;

the said third N-type driving module includes a third NMOS FET, a third resistor, a fifth comparator and a sixth comparator; the drain electrode of the said third NMOS FET connects to the cathode of the third LED-lamp group and the anode of the fourth LED-lamp group; the gate electrode of the said third NMOS FET connects to the logic controller; the source electrode of the said third NMOS FET gets grounded through the third resistor, while it also connects to the in-phase input ends of both the fifth comparator and the sixth comparator; the inverting input end of the said fifth comparator connects to the first reference voltage, and the output end connects to the logic controller; the inverting input end of the said sixth comparator connects to the second reference voltage, and the output end connects to the logic controller;

the said fourth N-type driving module includes a fourth NMOS FET, a fourth resistor, a seventh comparator, and an eighth comparator; the drain electrode of the said fourth NMOS FET connects to the cathode of the fourth LED-lamp group; the gate electrode of the said fourth NMOS FET connects to the logic controller; the source electrode of the said fourth NMOS FET gets grounded through the fourth resistor, while it also connects to the in-phase input ends of both the seventh comparator and the eighth comparator; the inverting input end of the said seventh comparator connects to the first reference voltage, and the output end connects to the logic controller; the inverting input end of the said eighth comparator connects to the second reference voltage, and the output end connects to the logic controller;

the said first P-type switching module includes: a first PMOS FET (Positive Channel Metal Oxide Semiconductor Field Effect Transistor), a fifth NMOS FET, a fifth resistor and a sixth resistor; the source electrode of the said first PMOS FET connects to the anode of the first LED-lamp bunch; the drain electrode of the said first PMOS FET connects to the cathode electrode of the first LED-lamp bunch; the gate electrode of the said first PMOS FET connects to the drain electrode of the fifth NMOS FET, while it also connects to the anode of the first LED bunch and the positive output end of the bridge rectifier through the sixth resistor; the source electrode of the fifth NMOS FET gets grounded through the fifth resistor; and the gate electrode of the fifth NMOS FET connects to the logic controller;

the said second P-type switching module includes: a second PMOS FET, a sixth NMOS FET, a seventh resistor and an eighth resistor; the source electrode of the said second PMOS FET connects to the anode of the second LED-lamp bunch and the cathode of the first LED-lamp bunch; the drain electrode of the said second PMOS FET connects to the cathode electrode of the second LED-lamp bunch; the gate electrode of the said second PMOS FET connects to the drain electrode of the sixth NMOS FET, while it also connects to the anode of the second LED-lamp bunch through the eighth resistor; the source electrode of the said sixth NMOS FET gets grounded through the seventh resistor; and the gate electrode of the sixth NMOS FET connects to the logic controller;

the said driving device for LED, wherein, the said first N-type driving module includes a first NPN (Negative-Positive-Negative) triode, a first resistor, a first comparator and a second comparator; a collecting electrode of the said first NPN triode connects to the cathode of the first LED-lamp group and the anode of the second LED-lamp group; a base electrode of the said first NPN triode connects to the logic controller; an emitting electrode of the said first NPN triode connects to the in-phase input ends of both the first comparator and the second comparator, while it also gets grounded through the first resistor; the inverting input end of the said first comparator connects to the first reference voltage, and the output end connects to the logic controller; the inverting input end of the said second comparator connects to the second reference voltage, and the output end connects to the logic controller;

the said second N-type driving module includes a second NPN triode, a second resistor, a third comparator and a fourth comparator; the collecting electrode of the said second NPN triode connects to the cathode of the second LED-lamp group and the anode of the third LED-lamp group; the base electrode of the said second NPN triode connects to the logic controller; the emitting electrode of the said second NPN triode connects to the in-phase input ends of both the third comparator and the fourth comparator, while it also gets grounded through the second resistor; the inverting input end of the said third comparator connects to the first reference voltage, and the output end connects to the logic controller; the inverting input end of the said fourth comparator connects to the second reference voltage, and the output end connects to the logic controller;

the said third N-type driving module includes a third NPN triode, a third resistor, a fifth comparator and a sixth comparator; the collecting electrode of the said third NPN triode connects to the cathode of the third LED-lamp group and the anode of the fourth LED-lamp group; the base electrode of the said third NPN triode connects to the logic controller; the emitting electrode of the said third NPN triode connects to the in-phase input ends of both the fifth comparator and the sixth comparator, while it also gets grounded through the third resistor; the inverting input end of the said fifth comparator connects to the first reference voltage, and the output end connects to the logic controller; the inverting input end of the said sixth comparator connects to the second reference voltage, and the output end connects to the logic controller;

the said fourth N-type driving module includes a fourth NPN triode, a fourth resistor, a seventh comparator and an eighth comparator; the collecting electrode of the said fourth NPN triode connects to the cathode of the fourth LED-lamp group; the base electrode of the said fourth NPN triode connects to the logic controller; the emitting electrode of the said fourth NPN triode connects to the in-phase input ends of both the seventh comparator and the eighth comparator, while it also gets grounded through the fourth resistor; the inverting input end of the said seventh comparator connects to the first reference voltage, and the output end connects to the logic controller; the inverting input end of the said eighth comparator connects to the second reference voltage, and the output end connects to the logic controller;

the said first P-type switching module includes: a first PNP (Positive-Negative-Positive) triode, a fifth NMOS FET, a fifth resistor and a sixth resistor; the emitting electrode of the first PNP triode connects to the anode of the first LED-lamp bunch; the collector electrode of the first PNP triode connects to the cathode of the first LED-lamp bunch; the base electrode of the said first PNP triode connects to the drain electrode of the fifth NMOS FET, while it also connects to the anode of the first LED-lamp bunch and the positive output end of the bridge rectifier through the sixth resistor; the source electrode of the said fifth NMOS FET gets grounded through the fifth resistor; the gate electrode of the said fifth NMOS FET connects to the logic controller;

the said second P-type switching module includes: a second PNP triode, a sixth NMOS FET, a seventh resistor and an eighth resistor; the emitting electrode of the second PNP triode connects to the anode of the second LED-lamp bunch and the cathode of the first LED-lamp bunch; the collector electrode of the second PNP triode connects to the cathode of the second LED-lamp bunch; the base electrode of the said second PNP triode connects to the drain electrode of the sixth NMOS FET, while it also connects to the anode of the second LED-lamp bunch through the eighth resistor; the source electrode of the said sixth NMOS FET gets grounded through the seventh resistor; the gate electrode of the said sixth NMOS FET connects to the logic controller;

the said driving device for LED, wherein, the said first LED-lamp bunch, the second LED-lamp bunch, the first LED-lamp group, the second LED-lamp group, the third LED-lamp group and the fourth LED-lamp group are composed by a plurality of LEDs or a plurality of HV LEDs connecting in serial, respectively.

The said driving device for LED, wherein, it also includes: an overvoltage protection module, applied for overvoltage protections, a thermal overload protection module, applied for overheating protections, and a voltage regulator; the said overvoltage protection module, thermal overload protection module and voltage regulator connect to the logic controller, respectively.

A driving method adopting the above said driving device for LED, wherein, it includes: a voltage output from a bridge rectifier shifts with time, and when a magnitude of voltage is increasing, the number of lighting LEDs increases accordingly; when the magnitude of voltage is decreasing, the number of lighting LED decreases accordingly.

When the magnitude of voltage is increasing, before neither a LED-lamp bunch nor a LED-lamp group is lighting on, following an output voltage rising, a N-type driving module controls the LED-lamp group to connect to a circuit; and following the voltage rising more, a P-type switching module controls the LED-lamp bunch to connect to the circuit;

when the magnitude of voltage is decreasing, and when both the LED-lamp bunch and the LED-lamp group are lighting on, following the voltage decreasing more, the P-type switching module controls the LED-lamp bunch to disconnect from the circuit; and following the voltage decreasing even more, the N-type driving module controls the LED-lamp bunch to disconnect from the circuit;

the said driving method, wherein, the said LED-lamp bunch includes a first LED-lamp bunch and a second LED-lamp bunch; the said P-type switching module includes a first P-type switching module and a second P-type switching module; the said LED-lamp group includes a first LED-lamp group, a second LED-lamp group, a third LED-lamp group and a fourth LED-lamp group; the said N-type driving module includes a first N-type driving module, a second N-type driving module, a third N-type driving module and a fourth N-type driving module;

when the magnitude of voltage is rising, when neither the first LED-lamp bunch, the second LED-lamp bunch, the first LED-lamp group, the second LED-lamp group, the third LED-lamp group, nor the fourth LED-lamp group is lighting on, following the output voltage rising, the first N-type driving module controls the first LED-lamp group to light on; and following the voltage rising more, the first P-type switching module also controls the first LED-lamp bunch to light on; then the voltage rises more, and the second P-type switching module controls the second LED-lamp bunch to light on, now the first LED-lamp bunch, the second LED-lamp bunch and the first LED-lamp group are all lighting on; following the voltage rising more, both the first LED-lamp bunch and the second LED-lamp bunch get light off, and the second N-type driving module controls the second LED-lamp group to light on, now the first LED-lamp group and the second LED-lamp group are lit-on; following the voltage rising more, the first LED-lamp bunch gets light on, now the first LED-lamp group, the second LED-lamp group and the first LED-lamp bunch are lit-on; following the voltage rising more, the second LED-lamp bunch gets light on, now the first LED-lamp group, the second LED-lamp group, the first LED-lamp bunch and the second LED-lamp bunch are lit-on; following the voltage rising more, the first LED-lamp bunch and the second LED-lamp bunch are lit-off, and the third LED-lamp group lights on; and so on, until all the LED-lamp bunches and the LED-lamp groups are lit-on;

when the magnitude of voltage is lowering, at the time when all the first LED-lamp bunch, the second LED-lamp bunch, the first LED-lamp group, the second LED-lamp group, the third LED-lamp group and the fourth LED-lamp group are lighting on; following the output voltage lowering, the second P-type switching module controls the second LED-lamp bunch to light off; and following the output voltage lowering more, the first P-type switching module controls the first LED-lamp bunch to light off, now the first LED-lamp group, the second LED-lamp group, the third LED-lamp group and the fourth LED-lamp group are lit-on; following the output voltage lowering more, the fourth N-type driving module controls the fourth LED-lamp group to light off, and the first LED-lamp bunch, the second LED-lamp bunch to light on; following the voltage decreasing more, the second P-type switching module control the second LED-lamp bunch to light off; following the voltage decreasing more, the first P-type switching module controls the first LED-lamp bunch to light off, now the first LED-lamp group, the second LED-lamp group and the third LED-lamp group are lit-on; and so on, until all the LED-lamp bunches and the LED-lamp groups are lighting off;

comparing to the prior art, the driving device for LED and the driving method thereof, as provided in the present invention, due to adopting a bridge rectifier, at least one LED-lamp bunch, at least one LED-lamp group, at least one P-type switching module, at least one N-type driving module and a logic controller, while the said LED-lamp bunch connects to the LED-lamp group in series; an anode of the said LED-lamp bunch connects to a positive output end of the bridge rectifier, a negative output end of the bridge rectifier gets grounded; a cathode of the said LED-lamp bunch connects to the anode of the LED-lamp group; the said logic controller connects to the anode and cathode of the LED-lamp bunches through the P-type switching module respectively; the said logic controller connects to the cathode of the LED-lamp groups; the said logic controller also connects to the negative input end of the bridge rectifier; controlling the N-type driving modules and P-type switching modules, through the logic controllers, makes the number of lit-on LED-lamps increase accordingly among the long LED-lamp series, which is composed by the said LED-lamp bunch and the said LED-lamp group, when a voltage magnitude of the input signals, after rectified by the bridge rectifier, is increasing; and when the voltage is decreasing, the number of lit-on LED-lamps decreases accordingly, among the long LED-lamp series, thus improves the efficiency of the driving device; and, adopting the driving device for LED as provided in the present invention, makes it easy to be integrated into the chips, and need no electric conductor or electrolysis capacitor, which saves the cost, and improves the stability of the system, extends the whole life of the driving device.

DETAILED DESCRIPTION

The present invention provides a driving device for LED and the driving method thereof, in order to make the purpose, technical solution and the advantages of the present invention clearer and more explicit, further detailed descriptions of the present invention are stated here, referencing to the attached drawings and some embodiments of the present invention. It should be understood that the detailed embodiments of the invention described here are used to explain the present invention only, instead of limiting the present invention.

Figure 1:
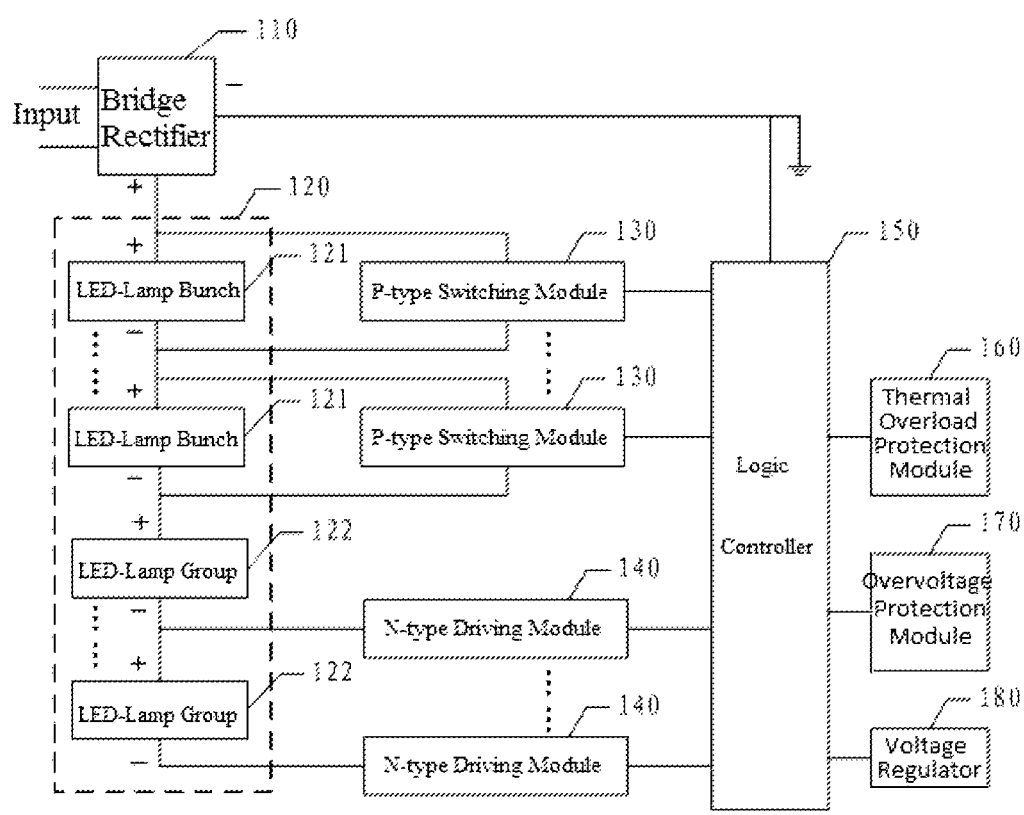
FIG. 1 illustrates a schematic diagram on a driving device for LED as provided in the present invention.

Referencing to FIG. 1, which is a schematic diagram on a driving device for LED as provided in the present invention. The driving device for LED as provided in the present invention includes: a bridge rectifier 110, at least one LED-lamp bunch 121, at least one LED-lamp group 122, at least one P-type switching module 130, at least one N-type driving module, and one logic controller 150.

The said LED-lamp bunch 121 is serially connecting to the said LED-lamp group 122; an anode of the said LED-lamp bunch 121 connects to a positive output end of the said bridge rectifier 110, while a negative output end of the said bridge rectifier 110 gets grounded; and a cathode of the said LED-lamp bunch 121 connects to the anode of the said LED-lamp group 122; the said logic controller 150 connects to the anode and cathode of the said LED-lamp bunch 121, through the said P-type switching module 130, respectively; and the said logic controller 150 connects to the cathode of the LED-lamp group 122, through the said N-type driving module 140; while the said logic controller 150 also connects to a negative input end of the said bridge rectifier 110.

Shown as FIG. 1, the number of the said LED-lamp bunch 121 is at least one, the number of the said LED-lamp group 122 is at least one. The said LED-lamp 121 connects to the said LED-lamp group 122, that is, The cathode of the said LED-lamp 121 connects to the anode of the said LED-lamp group 122 and if the number is more than one, then the plurality of LED-lamp bunches 121 connect to each other in serial, and the plurality of LED-lamp groups 122 connect to each other in serial, and both of them are also connecting in serial, as so on. The said LED-lamp bunch 121 and the LED-lamp group 122 connect in serial and compose a long LED-lamp series 120. The said LED-lamp bunch and LED-lamp group include at least one LED or HV LED, respectively. In general, both LED-lamp bunch 121 and LED-lamp group 122 are composed by a plurality of LEDs or HV LEDs connecting in serial, and the overall diode polarity is the same between a single LED-lamp bunch 121 or single LED-lamp group 122 and a single diode, based on the principle of the diode polarity.

The said P-type switching module 130 is connected to both ends of the LED-lamp bunch 121 in parallel, applied to drive the connection and disconnection of the LED-lamp bunch 121. The number of the said LED-lamp bunch is the same as that of the P-type switching module 130, and the number of the said P-type switching module 130 is according to that of the LED-lamp bunch 121. The said N-type driving module 140 is applied to drive the on and off of the LED-lamp groups 122. The number of the said LED-lamp groups 122 is the same as that of the N-type driving module 140, and the number of the said N-type driving modules 140 is according to that of the LED-lamp groups 122. The said logic controller 150 is applied to control the P-type switching module 130 and N-type driving module 140, in order to control the on and off of the LED-lamp bunch 121 and the LED-lamp groups 122, and finally control the number of light-on lamps in the LED-lamp series 120.

Furthermore, referencing to FIG. 1 again, the said driving device for LED also includes: a thermal overload protection module 160, an overvoltage protection module 170 and a voltage regulator 180. The said thermal overload protection module 160 is applied to protect the driving device from overheating; the said overvoltage protection module 170 is applied to protect the driving device from overvoltage; the said voltage regulator 180 is applied to keep the voltage stable. All of these have been widely applied in current technologies, and will not be explained in details here.

Figure 2:
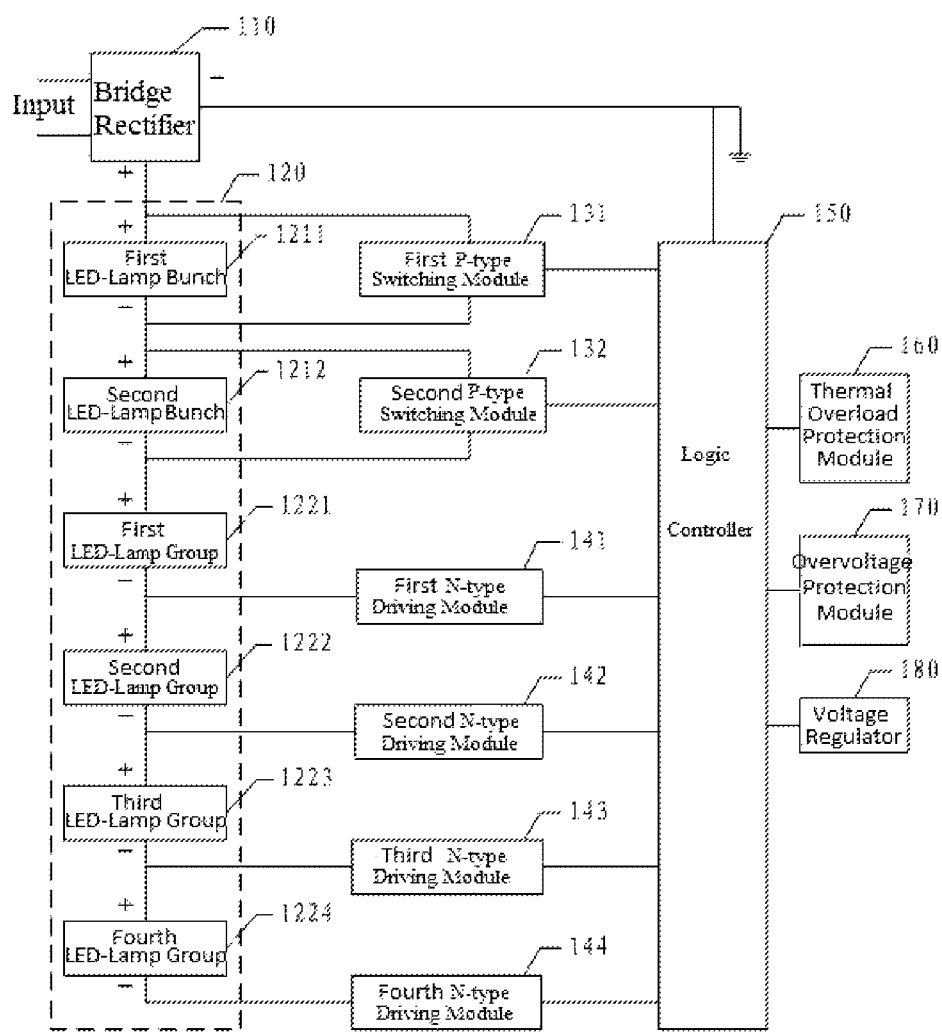
FIG. 2 illustrates a structure diagram on a first embodiment of a driving device for LED as provided in the present invention.

Furthermore, referencing to FIG. 2, which is a structure diagram on a first embodiment of a driving device for LED as provided in the present invention. The said driving device for LED includes: 2 LED-lamp bunches, that is, a first LED-lamp bunch 1211 and a second LED-lamp bunch 1212; 2 P-type switching modules, that is, a first P-type switching module 131 and a second P-type switching module 132; 4 LED-lamp groups, that is, a first LED-lamp group 1221, a second LED-lamp group 1222, a third LED-lamp group 1223, and a fourth LED-lamp group 1224; 4 N-type driving modules, that is, a first N-type driving module 141, a second N-type driving module 142, a third N-type driving module 143 and a fourth N-type driving module 144.

An anode of the said first LED-lamp bunch 1211 connects to a positive output end of the bridge rectifier 110, while a negative output end of the said bridge rectifier 110 gets grounded; the said logic controller 150 connects to both anode and cathode of the said first LED-lamp bunch 1211, through the said first P-type switching module 131, respectively. The said first P-type switching module 131 connects to both ends of the first LED-lamp bunch 1211 in parallel, applied to drive the on and off of the first LED-lamp bunch 1211. The said logic controller 150 is applied to control the work status of the first P-type switching module 131, in order to control the on and off of the first LED-lamp bunch 1211. The cathode of the said first LED-lamp bunch 1211 connects to the anode of the second LED-lamp bunch 1212; the said logic controller 150 connects to both anode and cathode of the second LED-lamp bunch 1212 through the second P-type switching module 132, respectively. The said second P-type switching module 132 connects to both ends of the second LED-lamp bunch 1212 in parallel, applied to control the on and off of the second LED-lamp bunch 1212. The said logic controller 150 is applied to control the work status of the second P-type switching module 132, in order to control the on and off of the first LED-lamp bunch 1212.

The cathode of the said second LED-lamp bunch 1212 connects to the anode of the first LED-lamp group 1221; the cathode of the said first LED-lamp group 1221 connects to the anode of the second LED-lamp group 1222;

the said logic controller 150 connects to the cathode of the first LED-lamp group 1221, through the said first N-type driving module 141; the cathode of the said second LED-lamp group 1222 connects to the anode of the third LED-lamp group 1223; the said logic controller 150 also connects to the cathode of the second LED-lamp group 1222, through the second N-type driving module 142; the cathode of the said third LED-lamp group 1223 connects to the anode of the fourth LED-lamp group 1224; the said logic controller 150 also connects to the cathode of the third LED-lamp group 1223, through the third N-type driving module 143; the said logic controller 150 connects to the cathode of the fourth LED-lamp group 1224, through the fourth N-type driving module 144. The said first N-type driving module 141 is applied to control the on and off of the first LED-lamp group 1221. The said second N-type driving module 142 is applied to control the on and off of the second LED-lamp group 1222. The said third N-type driving module 143 is applied to control the on and off of the third LED-lamp group 1223. The said fourth N-type driving module 144 is applied to control the on and off of the fourth LED-lamp group 1224. The said logic controller 150 also connects to the negative output end of the bridge rectifier 110. The said logic controller 150 is applied to control the work status of the first N-type driving module 141, the second N-type driving module 142, the third N-type driving module 143 and the fourth N-type driving module 144, respectively, so as to control the on and off of the first LED-lamp group 1221, the second LED-lamp group 1222, the third LED-lamp group 1223 and the fourth LED-lamp group 1224, respectively.

The said first LED-lamp bunch 1211, second LED-lamp bunch 1212, first LED-lamp group 1221, second LED-lamp group 1222, third LED-lamp group 1223, and fourth LED-lamp group 1224 are connecting one by one in sequence, that is, the cathode of the first LED-lamp bunch 1211 connects to the anode of the second LED-lamp bunch 1212, the cathode of the second LED-lamp bunch 1212 connects to the anode of the first LED-lamp group 1221, and so on, composing a long LED-lamp series 120. Due to the property of LED, the anode of each LED-lamp bunch is pointing to the same direction when connecting in series.

In the present embodiment, through controlling the work status of the first P-type switching module 131, the second P-type switching module 132, the first N-type driving module 141, the second N-type driving module 142, the third N-type driving module 143 and the fourth N-type driving module 144, the said logic controller 150 makes the voltage of the input signals output from the bridge rectifier 110 rise from 0 to the peak value, during such a time period that, the voltage of the input signals after rectified by the bridge rectifier 110 is increasing, that is, a phase of an AC input into the bridge rectifier 110 is during 0°~90° or 180°~270°, and following the voltage rising, the number of lit-on LED lamps in the long LED-lamp series 120 is increasing accordingly; and when the voltage of the input signals is decreasing, that is, during such a time period that, the phase of the AC input into the bridge rectifier 110 is during 90°~180° or 270°~360°, the voltage output from the bridge rectifier 110 decrease from peak value to 0, and following the voltage decreasing, the number of lit-on LED lamps in the long LED-lamp series 120 is decreasing accordingly.

In the present embodiment, the said first LED-lamp bunch 1211, the second LED-lamp bunch 1212, the first LED-lamp group 1221, the second LED-lamp group 1222, the third LED-lamp group 1223 and the fourth LED-lamp group 1224 are composed by a plurality of LEDs or HV LEDs connecting in series. Here HV LED means high voltage LED, thus will not be described in details.

The number of LED lamps in the said first LED-lamp bunch 1211, the second LED-lamp bunch 1212, the first LED-lamp group 1221, the second LED-lamp group 1222, the third LED-lamp group 1223 and the fourth LED-lamp group 1224 is more than one, that is, the number of LED-lamps in the above said LED-lamp bunches and LED-lamp groups is a non-zero value.

That is, either the said first LED-lamp bunch 1211 or the second LED-lamp bunch 1212 may be composed by different or same number of LEDs connecting in series. The numbers of LED lamps in the said first LED-lamp group 1221, second LED-lamp group 1222, third LED-lamp group 1223 and fourth LED-lamp group 1224 may be the same or different.

Preferably, arranging a reasonably number of LEDs in each LED-lamp bunch and LED-lamp group, the said driving device for LED may achieve the function of increasing the number of lit-on LEDs in a fixed pace, when the voltage is rising; and decreasing the number of lit-on LEDs in a fixed pace, when the voltage is lowering.

The said bridge rectifier 110 connects to an AC input end, applied to rectify an input AC power, and convert the input AC power into single polar AC power for output. Here the input power is usually the municipal electric power, i.e., 220V AC in China. For the bridge rectifier 110, it contains a four-diode-composed bridge circuit inside, which belongs to the current technology, and will not be described in details here.

Figure 3:
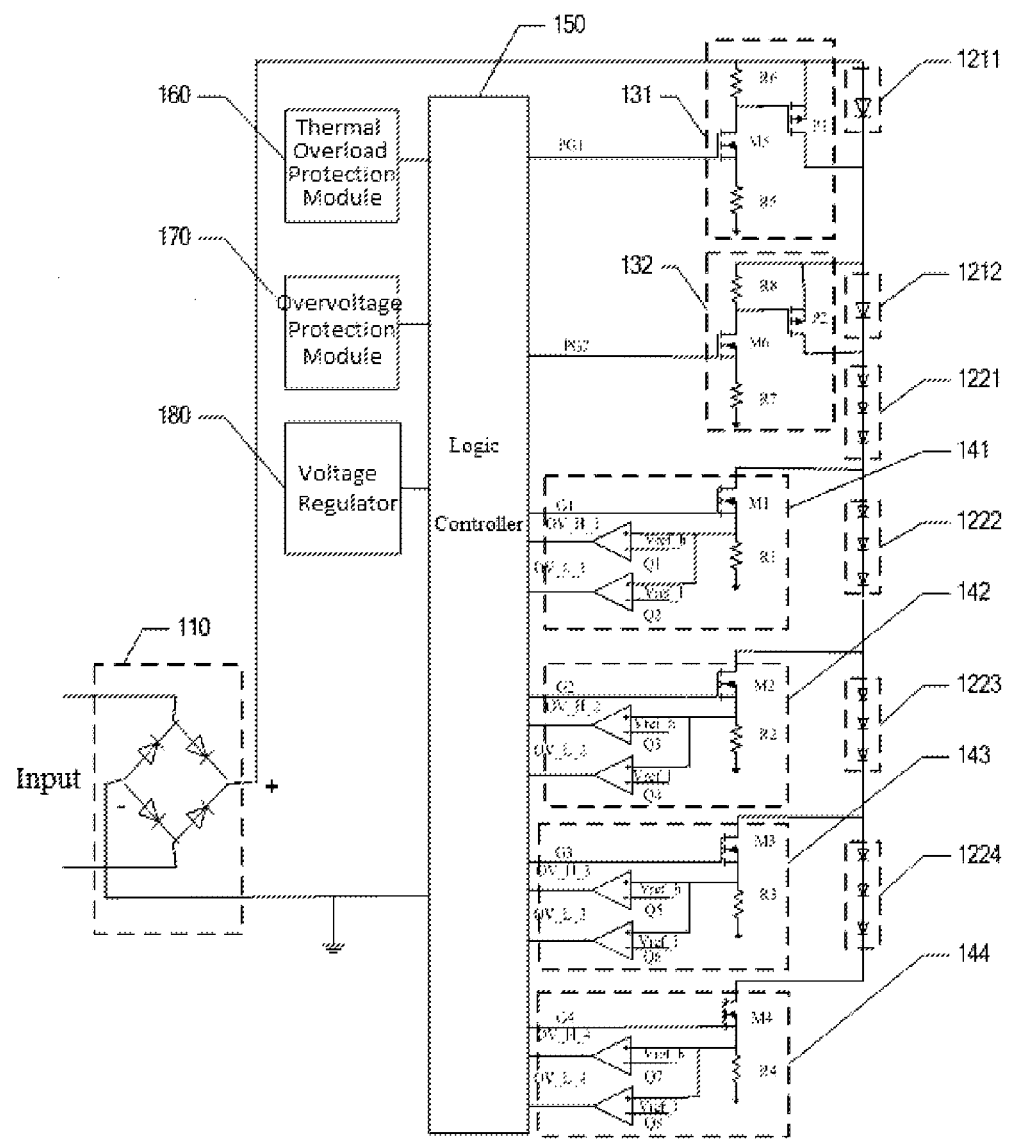
FIG. 3 illustrates a schematic on the first embodiment of the driving device for LED as provided in the present invention.

Furthermore, referencing to FIG. 3, which is a schematic on the first embodiment of the driving device for LED as provided in the present invention, the said first N-type driving module 141 includes a first NMOS FET M1, a first resistor R1, a first comparator Q1 and a second comparator Q2. A drain electrode of the said first NMOS FET M1 connects to the cathode of the first LED-lamp group 1221 and anode of the second LED-lamp group 1222; a gate electrode of the said first NOMS FET M1 connects to a G1 end of the logic controller 150; a source electrode of the said first NMOS FET M1 gets grounded through the first resistor R1, and the source electrode of the said first NMOS FET M1 also connects to the in-phase input ends of both the first comparator Q1 and the second comparator Q2; an inverting input end of the said first comparator Q1 connects to a first reference voltage Vref_h, and the output end connects to an OV_H_1 end of the logic controller 150; the inverting input end of the second comparator Q2 connects to a second reference voltage Vref_I, and the output end connects to an OV_L_1 end of the logic controller 150.

The said second N-type driving module 142 includes a second NMOS FET M2, a second resistor R2, a third comparator Q3 and a fourth comparator Q4. The drain electrode of the said second NMOS FET M2 connects to the cathode of the second LED-lamp group 1222 and anode of the third LED-lamp group 1223; the gate electrode of the said second NOMS FET M2 connects to a G2 end of the logic controller 150; the source electrode of the said second NMOS FET M2 gets grounded through the second resistor R2, and the source electrode of the said second NMOS FET M2 also connects to the in-phase input ends of both the third comparator Q3 and the fourth comparator Q4; the inverting input end of the said third comparator Q3 connects to the first reference voltage Vref_h, and the output end connects to an OV_H_2 end of the logic controller 150; the inverting input end of the fourth comparator Q4 connects to the second reference voltage Vref_I, and the output end connects to an OV_L_2 end of the logic controller 150.

The said third N-type driving module 143 includes a third NMOS FET M3, a third resistor R3, a fifth comparator Q5 and a sixth comparator Q6. The drain electrode of the said third NMOS FET M3 connects to the cathode of the third LED-lamp group 1223 and anode of the fourth LED-lamp group 1224; the gate electrode of the said third NOMS FET M3 connects to a G3 end of the logic controller 150; the source electrode of the said third NMOS FET M3 gets grounded through the third resistor R3, and the source electrode of the said third NMOS FET M3 also connects to the in-phase input ends of both the fifth comparator Q5 and the sixth comparator Q6; the inverting input end of the said fifth comparator Q5 connects to the first reference voltage Vref_h, and the output end connects to an OV_H_3 end of the logic controller 150; the inverting input end of the sixth comparator Q6 connects to the second reference voltage Vref_I, and the output end connects to an OV_L_3 end of the logic controller 150.

The said fourth N-type driving module 144 includes a fourth NMOS FET M4, a fourth resistor R4, a seventh comparator Q7 and an eighth comparator Q8. The drain electrode of the said fourth NMOS FET M4 connects to the cathode of the fourth LED-lamp group 1224; the gate electrode of the said fourth NOMS FET M4 connects to a G4 end of the logic controller 150; the source electrode of the said fourth NMOS FET M4 gets grounded through the fourth resistor R4, and the source electrode of the said fourth NMOS FET M4 also connects to the in-phase input ends of both the seventh comparator Q7 and the eighth comparator Q8; the inverting input end of the said seventh comparator Q7 connects to the first reference voltage Vref_h, and the output end connects to an OV_H_4 end of the logic controller 150; the inverting input end of the eighth comparator Q8 connects to the second reference voltage Vref_I, and the output end connects to an OV_L_4 end of the logic controller 150.

Obviously, the circuits for the said first N-type driving module 141, the second N-type driving module 142, the third N-type driving module 143 and the fourth N-type driving module 144 are the same. Furthermore, in order to drive more LED-lamps, achieve better driving effects and illumination effects, it is possible to increase the number of LED-lamp groups and N-type driving modules accordingly. This belongs to a simple transformation, and will not be explained in details here anymore.

Continue referencing to FIG. 3. The said first P-type switching module 131 includes: a first PMOS FET P1, a fifth NMOS FET M5, a fifth resistor R5 and a sixth resistor R6; the source electrode of the said first PMOS FET P1 connects to the anode of the first LED-lamp bunch 1211; the drain electrode of the said first PMOS FET P1 connects to the cathode of the first LED-lamp bunch 1211; the gate electrode of the said first PMOS FET P1 connects to the drain electrode of the fifth NMOS FET M5, it also connects to the anode of the first LED-lamp bunch 1211 and the positive output end of the bridge rectifier 110, through the sixth resistor R6; the source electrode of the said fifth NMOS FET M5 gets grounded through the fifth resistor R5; the gate electrode of the fifth NMOS FET M5 connects to a PG1 end of the logic controller 150.

The circuit of the said second P-type switching module 132 is the same as that of the first P-type switching module 131. The said second P-type switching module 132 includes: a second PMOS FET P2, a sixth NMOS FET M6, a seventh resistor R7 and an eighth resistor R8; the source electrode of the said second PMOS FET P2 connects to the anode of the second LED-lamp bunch 1212 and the cathode of the first LED-lamp bunch 1211; the drain electrode of the said second PMOS FET P2 connects to the cathode of the second LED-lamp bunch 1212 and the anode of the first LED-lamp group 1221; the gate electrode of the said second PMOS FET P2 connects to the drain electrode of the sixth NMOS FET M6, it also connects to the anode of the second LED-lamp bunch 1212 and the cathode of the first LED-lamp bunch 1211, through the eighth resistor R8; the source electrode of the said sixth NMOS FET M6 gets grounded through the seventh resistor R7; the gate electrode of the sixth NMOS FET M6 connects to a PG2 end of the logic controller 150.

Obviously, the circuits for the said first P-type switching module 131 and the second P-type switching module 132 are the same. Furthermore, in order to drive more LED-lamps, achieve better driving effects and illumination effects, it is possible to increase the number of LED-lamp bunches and P-type switching modules accordingly. This belongs to a simple transformation, and will not be explained in details here anymore.

Figure 4:
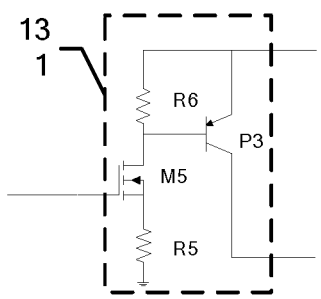
FIG. 4 illustrates a schematic of a P-type switching module in a second embodiment of a driving device for LED as provided in the present invention.
Figure 5:
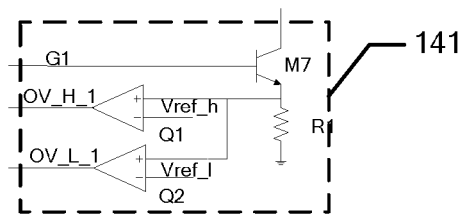
FIG. 5 illustrates a schematic of a N-type driving module in the second embodiment of the driving device for LED as provided in the present invention.

Furthermore, referencing to FIG. 4 and FIG. 5 together, wherein, FIG. 4 illustrates a schematic of a P-type switching module in a second embodiment of a driving device for LED as provided in the present invention, and FIG. 5 illustrates a schematic of a N-type driving module in the second embodiment of the driving device for LED as provided in the present invention. Comparing FIG. 3 to FIG. 4, it can be seen that, the first PMOS FET P1 in the above said first P-type switching module 131 may be substituted by a PNP triode P3. Now the connection method becomes: using an emitting electrode of the PNP triode P3 to substitute the source electrode of the first PMOS FET P1 and connect to the circuit, using a collection electrode of the PNP triode P3 to substitute the drain electrode of the first PMOS FET P1 and connect to the circuit, using a base electrode of the PNP triode P3 to substitute the gate electrode of the first PMOS FET P1 and connect to the circuit. In the same way, similar substitutions can also be applied to other P-type switching modules. This belongs to simple substitutions to the circuits of embodiments, thus will not be described in details here anymore. This substitution method is just using PNP triodes to substitute the PMOS FETs, and the P-type switching modules after substitution can also achieve the same function, thus belong to the scope of protection in the appended claims of the present invention.

Comparing FIG. 3 to FIG. 5, it can be seen that, the first NMOS FET M1 in the above said first N-type driving module 141 may be substituted by an NPN triode M7. The collection electrode of the NPN triode M7 substitutes the drain electrode of the first NMOS FET M1 and connects to the cathode of the first LED-lamp group 1221; the base electrode of the said NPN triode M7 substitutes the gate electrode of the first NMOS FET M1 and connects to the G1 end of the logic controller 150; the emitting electrode of the said NPN triode M7 substitutes the source electrode of the first NMOS FET M1 and connect to the circuit. In the same way, similar substitutions can also be applied to other N-type driving modules. This belongs to simple substitutions to the circuits of embodiments, thus will not be described in details here anymore. This substitution method is just using NPN triodes to substitute the NMOS FETs, and the N-type driving modules after substitution can also achieve the same function, thus belong to the scope of protection in the appended claims of the present invention.

Further detailed descriptions for the principle of present invention are stated below, combining with FIG. 3.

In the present embodiment, the lowest withstanding voltage for Vds (Voltage difference between drain electrode and source electrode) of the said first PMOS FET P1 is the voltage difference between two ends when the first LED-lamp bunch 1211 is lit-on. Take the case that the LEDs in the said first LED-lamp bunch 1211 are HV (high voltage) LEDs as an example for description: the said HV LEDs are usually composed by 6 LEDs with 1 watt each connecting in serial, then the voltage drop is 18V, so as the values of the lowest Vsb (Voltage difference between the source electrode and the bulk electrode) and Vdb (Voltage difference between the drain electrode and the bulk electrode), and the lowest Vb_sub (the voltage between bulk and substrate) is 311V, in real technologies, a larger threshold is also applicable, based on current semiconductor technology, the said MOS tube may be integrated into the chip, that is, further integrations are applicable for the driving circuit, so as to reduce the circuit layout as well as the space occupation, that may cause the said driving device for LED be made smaller, then the finished product smaller, which greatly facilitates the use for people.

In the present embodiment of the invention, the circuits for the said first N-type driving module 141, the second N-type driving module 142, the third N-type driving module 143 and the fourth N-type driving module 144 are also the same. The said first resistor R1, second resistor R2, third resistor R3 and fourth resistor R4 are all sampling resistors. The said first comparator Q1, third comparator Q3, fifth comparator Q5 and seventh comparator Q7 are used for overcurrent detection, through comparing the voltages of the sampling resistors to the first reference voltage Vref_h. Take the first comparator Q1 as an example, when the current of the first resistor R1 exceeds the preset value, that is, when the voltage of the sampling resistor exceeds the first reference voltage Vref_h, the output end of the said first comparator Q1 outputs a high electric level, otherwise, outputs a low electric level. The said second comparator Q2, fourth comparator Q4, sixth comparator Q6 and eighth comparator Q8 are used for under current detection, through comparing the voltages of the sampling resistors to the second reference voltage Vref_I. Take the second comparator Q2 as an example, when the current of the second resistor R2 is less than the preset value, then the output end of the said second comparator Q2 outputs a high electric level, otherwise, outputs a low electric level. The said logic controller 150 controls the electric level status of the gate electrode of each NMOS FET, through signals output from comparators, that is, the output results from overcurrent detection and under current detection, therefore achieves the control of on and off for each LED-lamp group, When adopting the driving device for LED provided in the present invention, after power on reset, the G1 end up to G4 end of the said logic controller 150 are all on a high level, so as a PG1 end and PG2 end, the first NMOS FET up to the fourth NMOS FET are all on, while the first PMOS FET P1 and the second PMOS FET P2 are off.

When the phases of the AC input signals are locating among 0°~90° or 180°~270°, the output voltage from the bridge rectifier 110 rises from 0 to the highest point.

The detailed process for the principle of the said high efficiency driving device for LED is as following: when the output voltage from the bridge rectifier 110 is relatively low, the first LED-lamp group 1221 lights on, and the current flows into the first NMOS FET M1 from the first LED-lamp group 1221. Following the rising of the output voltage from the bridge rectifier 110, the current in the first LED-lamp group 1221 increases gradually, the voltage on the sampling resistor connecting to the source electrode of the first MMOS FET M1, i.e., the first resistor R1, rises gradually, after the first comparator Q1 comparing the sampling voltage to the first reference voltage Vref_h, it outputs a high electric level, that is, the OV_H_1 end of the logic controller 150 is at a high electric level. Then the said logic controller 150 sets the PG1 end into a low electric level, based on that the detected OV_H_1 end is on a high electric level, that makes the first PMOS FET P1 an off status, thus gets the first LED-lamp bunch 1211 connect to the circuit and light on, now the lit-on LEDs include the first LED-lamp bunch 1211 and the first LED-lamp group 1221. Following the voltage rising more, the current in the long LED-lamps series 120 keeps increasing, when the OV_H_1 end of the logic controller 150 is at a high electric level again, the PG2 end is set to a low electric level, that makes the second PMOS FET P2 shut off, and light on the second LED-lamp bunch 1212, now the lit-on LEDs include the first LED-lamp bunch 1211, the second LED-lamp bunch 1212 and the first LED-lamp group 1221.

Following further voltage rising, when the OV_H_1 end of the logic controller 150 is at a high electric level, the said logic controller 150 sets the G1 end into a low electric level, as well as the PG1 end and PG2 end into a high electric level, then the first LED-lamp group 1221 and the second LED-lamp group 1222 are on the lit-on status while the first LED bunch 1211 and the second LED-lamp bunch 1212 are on the lit-off status. Following the voltage rising, the current in the first LED-lamp group 1221 and the second LED-lamp group 1222 increases gradually, when the voltage on the sampling resistor connecting to the source electrode of the second NMOS FET M2, i.e., the second resistor R2, exceeds the first reference voltage Vref_h, the OV_H_2 end of the logic controller 150 is on a high electric level. When the logic controller 150 sets the PG1 end a low electric level, the first LED-lamp bunch 1211 gets light on, now due to the potential dividing function of the first LED-lamp bunch 1211, the OV_H_2 end of the logic controller 150 becomes the low electric level. Following the voltage keep rising, when the OV_H_2 end becomes the high electric level again, the logic controller 150 sets the PG2 end a low electric level, and lights on the second LED-lamp bunch 1212, now the OV_H_2 end of the logic controller 150 converts to the low electric level again. Now the lit-on LEDs include the first LED-lamp bunch 1211, the second LED-lamp bunch 1212, the first LED-lamp group 1221 and the second LED-lamp group 1222. Following the voltage continuing rising, the OV_H_2 end converts to the high electric level the third time, the logic controller 150 sets the G2 end the low electric level, and the PG1 end and PG2 end the high electric level, now the first LED-lamp group 1221, the second LED-lamp group 1222 and the third LED-lamp group 1223 are on the lit-on status, while the first LED-lamp bunch 1211 and the second LED-lamp bunch 1212 are on the lit-off status, and so on, until all the LED-lamp groups left are lit on in sequence.

When the phases of the AC input signals are locating among 90°~180° or 270°~360°, the output voltage from the bridge rectifier 110 decreases from the highest value to 0. When the output voltage of the bridge rectifier 110 reaches a certain value, such as a relatively high voltage value, the long LED-lamp series 120 are all lit on, the current flows into the fourth N-type driving module 144 from the long LED-lamp series 120. Following lowering the output voltage from the bridge rectifier 110, the output current decreases gradually, the voltage of the sampling resistor to the source electrode of the fourth NMOS FET M4, i.e., the fourth resistor R4, is also lowering gradually. When the sampling voltage is less than the second reference voltage Vref_l of the seventh comparator Q7, an OV_L_4 end in the said logic controller 150 is at a low electric level, and based on the low electric level at the OV_L_4 end, the logic controller 150 sets the G4 end as well as PG1 and PG4 ends a low electric level, now the fourth LED-lamp group 1224 is at the lit-off status, while the first LED-lamp bunch 1211, the second LED-lamp bunch 1212, the first LED-lamp group 1221, the second LED-lamp group 1222 and the third LED-lamp group 1223 are all at a lit-on status. Since the number of lit-on LEDs is decreasing, the OV_L_4 end of the logic controller 150 converts into a high electric level. When the voltage is lowering again, the OV_L_4 end is at a low electric level, the set logic controller 150 sets the PG1 end a high electric level, which makes the first LED-lamp bunch 1211 at a lit-off status, and the OVL_4 end recovers to the high electric level. When the voltage keeps lowering, the OV_L_4 end outputs a low electric level, and the said logic controller 150 sets the PG2 end a high electric level, which makes the second LED-lamp bunch 1212 at the lit-off status, and the OV_L_4 end recovers to the high electric level, now the first LED-lamp group 1221, the second LED-lamp group 1222, and the third LED-lamp group 1223 are on the lit-on status. When the voltage keeps lowering more, the OV_L_4 end becomes the low electric level, the said logic controller 150 sets the G3 end the low electric level, as well as the PG1 end and PG2 end, now the third LED-lamp group 1223 and the fourth LED-lamp group 1224 are on the lit-off status, while the first LED-lamp bunch 1211, the second LED-lamp bunch 1212, the first LED-lamp group 1221 and the second LED-lamp group 1222 are on the lit-on status, and so on, until all the LED-lamps left are lit off in sequence.

In specific applications, the current value of the inverting input end of the comparator connecting to the first reference voltage Vref_h is set to be 10 mA, and the current value of the inverting input end of the comparator connecting to the second reference voltage Vref_l is set to be 50 mA. The NMOS FET in the N-type driving module and the sampling resistor compose a current source circuit, in designs for specific applications, the maximum current in the current source circuit is set to be 60 mA, which is higher than the overflow current 50 mA set by the first reference voltage Vref_h.

When the first LED-lamp group 1221 is lit-on, and the voltage is in the rising time period, the current in the first LED-lamp group 1221 is increasing gradually, and the voltage applied to the upper end of the first resistor R1 is also rising accordingly. When the voltage applied to the upper end of the first resistor R1 is higher than the first reference voltage Vref_h, the current in the first LED-lamp group 1221 is over 50 mA. Now due to the property of the constant current source circuit, the voltage applied on the drain electrode of the first NMOS FET M1 will be very low, close to the voltage applied to the upper end of the first resistor R1, then the first LED-lamp bunch 1211 is lit on. Now, both the first LED-lamp bunch 1211 and the first LED-lamp group 1221 are lit-on. Due to the number of LEDs connecting to the circuit increases abruptly, the current in the long LED-lamps bunch 120 decreases, and by controlling the numbers of the first LED-lamp bunch 1211 and the second LED-lamp bunch 1212, it is possible to ensure the ratio of the number of increased LEDs to the number of lit-on LEDs not exceeding a certain upper limit, thus ensures the illumination of the long LED-lamp series 120 not too low, for example, it is possible to choose 1/3, 1/4 or else as an upper limit to the ratio. In the same logic, it also ensures the ratio of the eliminated LED numbers to that of the lit-on LEDs not exceeding a certain upper limit, thus ensures the illumination of the long LED-lamp series 120 not changing too fast, getting brighter in a sudden.

Also, the high efficiency driving device for LED provided in the present invention, following the voltage rising, the current in the LED-lamp bunch increases, and the voltage applied on the upper end of the sampling resistor rises accordingly. However, since the current in the LED-lamp bunch is always less than the maximum current of the current source, 60 mA, the voltages applied to the drain electrodes of the first NMOS FET M1 up to the sixth NMOS FET M6 are always close to the upper end voltage of the sampling resistor. In real designs, the value of the sampling resistor is adopted to be 30 ohm, the power lost of the driving module during the driving process is less than 30 ohm*50 mA*50 mA=75 mW. Adopting the above designs together, during the processes of voltages changing from the lowest to the highest and from the highest to the lowest, through reasonable controlling, it is possible to ensure the power consumption of the driving module to be about 75 mW, thus greatly improves the efficiency of the driving device.

Based on the above principles, the present invention also provides an LED driving method, includes: an output voltage from a bridge rectifier changes with the time, when a voltage amplitude is in the increasing stage, the number of lit-on LEDs increases accordingly; when the voltage amplitude is in the decreasing stage, the number of lit-on LEDs decreases accordingly; when the voltage amplitude is in the increasing stage, for example, when neither the LED-lamp bunch nor the LED-lamp group is lit on, following the output voltage rising, a N-type driving module controls the LED-lamp group connect to the circuit, and following the output voltage continuing rising, a P-type switching module controls the LED-lamp bunch connect to the circuit; when the voltage amplitude is in the decreasing stage, for example, when both the LED-lamp bunch and LED-lamp group are lit on; following the output voltage lowering, the P-type switching module controls the LED-lamp bunch not connecting to the circuit, and following the output voltage keeping lowering, the N-type driving module controls the LED-lamp group not connecting to the circuit.

Furthermore, the said LED-lamp bunch includes a first LED-lamp bunch and a second LED-lamp bunch; the said P-type switching module includes a first P-type switching module and a second P-type switching module; the said LED-lamp group includes a first LED-lamp group, a second LED-lamp group, a third LED-lamp group and a fourth LED-lamp group; the said N-type driving module includes a first N-type driving module, a second N-type driving module, a third N-type driving module and a fourth N-type driving module;

When the voltage amplitude is in the increasing stage, for example, when either of the first LED-lamp bunch, the second LED-lamp bunch, the first LED-lamp group, the second LED-lamp group, the third LED-lamp group or the fourth LED-lamp group is lit on, following the output voltage rising, the first N-type driving module controls the first LED-lamp group light on, following the output voltage keeping rising, the first P-type switching module controls the first LED-lamp bunch light on; voltage keeps rising, and the second P-type switching module controls the second LED-lamp bunch light on, now the first LED bunch, the second LED bunch and the first LED group are lit-on; following the voltage keeping rising, the first LED-lamp bunch and the second LED-lamp bunch get light off, the second N-type driving module controls the second LED-lamp group light on, now the first LED lamp group and the second LED-lamp group are lit-on; following the voltage keeping rising, the first LED-lamp bunch lights on, now the first LED-lamp group, the second LED-lamp group and the first LED-lamp bunch are lit-on; following the voltage keeping rising, the second LED-lamp bunch lights on, now the first LED-lamp group, the second LED-lamp group, the first LED-lamp bunch and the second LED-lamp bunch are lit-on; following the voltage keeping rising, the first LED-lamp bunch and the second LED-lamp bunch light off, while the third LED-lamp group lights on; and so on, until all the LED-lamp bunches and LED-lamp groups are lit-on.

When the voltage amplitude is in the decreasing stage, for example, when all of the first LED-lamp bunch, the second LED-lamp bunch, the first LED-lamp group, the second LED-lamp group, the third LED-lamp group and the fourth LED-lamp group are lit on, following the output voltage lowering, the second P-type switching module controls the second LED-lamp bunch light off, following the output voltage keeping lowering, the first P-type switching module controls the first LED-lamp bunch light off, now the first LED-lamp group, the second LED-lamp group, the third LED-lamp group and the fourth LED-lamp are all lit on; voltage keeps lowering, the fourth N-type driving module controls the fourth LED-lamp group light off, now the first LED-lamp bunch and the second LED-lamp bunch are lit on; voltage keeps lowering, the second P-type switching module controls the second LED-lamp bunch light off; following the output voltage keeping lowering, the first P-type switching module controls the first LED-lamp bunch light off, now the first LED lamp group, the second LED-lamp group and the third LED-lamp group are lit-on; and so on, until all the LED-lamp bunches and LED-lamp groups are lit-off.

In a summary, the driving device for LED and the driving method thereof, provided in the present invention, due to adopting a bridge rectifier, at least one LED-lamp bunch, at least one LED-lamp group, at least one P-type switching module, at least one N-type driving module and a logic controller, while the said LED-lamp bunch connects to the LED-lamp group in series; an anode of the said LED-lamp bunch connects to a positive output end of the bridge rectifier, a negative output end of the bridge rectifier gets grounded; a cathode of the said LED-lamp bunch connects to the anode of the LED-lamp group; the said logic controller connects to the anode and cathode of the LED-lamp bunches through the P-type switching module respectively; the said logic controller connects to the cathode of the LED-lamp groups; the said logic controller also connects to the negative input end of the bridge rectifier, makes the number of lit-on LED-lamps increase accordingly among a long LED-lamp series, when a voltage magnitude of the input signals is increasing, after rectified by the bridge rectifier; and when a voltage is decreasing, the number of lit on LED-lamps decreases accordingly, among the long LED-lamp series, thus improves the efficiency of the driving device; and, adopting the driving device for LED as provided in the present invention, which is easy to be integrated into chips, makes the driving device occupy a small space, and easy to get miniaturizations.

The driving device for LED provided in the present invention needs no conductors or electrolytic capacities, thus saves the cost, improves the system stability, and increases the work life of the whole driving device. At the same time, it improves the driving efficiency through special controlling methods. The present invention makes it possible to increase the number of lit-on LEDs in a certain pace, when the voltage is rising; and decrease the number of lit-on LEDs in a certain pace, when the voltage is lowering. The driving device for LED provided in the present invention is able to adjust the current in the LEDs anytime following the voltage changing, and ensure almost all AC power voltage being applied to the LED wicks, which has greatly improved the utilization efficiency, as well as that of the LED chips.

It should be understood that, the application of the present invention is not limited to the above examples listed. It will be possible for a person skilled in the art to make modification or replacements according to the above descriptions, which shall all fall within the scope of protection in the appended claims of the present invention.

What is claimed is:

1. A driving device for an LED, wherein, said driving device for an LED includes:
    a bridge rectifier, at least one LED-lamp bunch, at least one LED-lamp group, at least one P-type switching module, at least one N-type driving module, and a logic controller; said bridge rectifier, applied to rectify input signals; said P-type switching module, applied to drive said LED-lamp bunch; said N-type driving module, applied to drive said LED-lamp group; said logic controller, applied to control said P-type switching module and N-type driving module; wherein, the number of said LED-lamp bunch is the same as that of said P-type LED-lamp switching module; while the number of said LED-lamp groups is the same as that of said N-type driving module; said LED-lamp bunch connects to said LED-lamp group in serial; an anode of said LED-lamp bunch connects to a positive output end of said bridge rectifier, while a negative output end of said bridge rectifier gets grounded; a cathode of said LED-lamp bunch connects to the anode of said LED-lamp group; said logic controller connects to the anode and cathode of said LED-lamp bunch, respectively, through said P-type switching module; and said logic controller connects to the cathode of the LED-lamp group, through said N-type driving module; while said logic controller also connects to a negative input end of said bridge rectifier;
    2 LED-lamp bunches, that is, a first LED-lamp bunch and a second LED-lamp bunch, respectively;
    2 P-type switching modules, that is, a first P-type switching module and a second P-type switching module, respectively;
    4 LED-lamp groups, that is, a first LED-lamp group, a second LED-lamp group, a third LED-lamp group and a fourth LED-lamp group, respectively;
    4 N-type driving modules, that is, a first N-type driving module, a second N-type driving module, a third N-type driving module and a fourth N-type driving module, respectively;

wherein said first LED-lamp bunch, second LED-lamp bunch, first LED-lamp group, second LED-lamp group, third LED-lamp group and fourth LED-lamp group are connecting one by one in the sequence; the anode of said first LED-lamp bunch connects to the positive output end of said bridge rectifier, while the negative output end of said bridge rectifier gets grounded; said logic controller connects to the anode and cathode of said first LED-lamp bunch, through said first P-type switching module, respectively; the cathode of said first LED-lamp bunch connects to the anode of said second LED-lamp bunch; said logic controller connects to the anode and cathode of said second LED-lamp bunch, through said second P-type switching module, respectively; the cathode of said second LED-lamp bunch connects to the anode of said first LED-lamp group; the cathode of said first LED-lamp group connects to the anode of said second LED-lamp group; said logic controller connects to the cathode of said first LED-lamp group, through said first N-type driving module; the cathode of said second LED-lamp group connects to the anode of said third LED-lamp group; said logic controller connects to the cathode of said second LED-lamp group, through said second N-type driving module; the cathode of said third LED-lamp group connects to the anode of said fourth LED-lamp group; said logic controller connects to the cathode of said third LED-lamp group, through said third N-type driving module; said logic controller connects to the cathode of said fourth LED-lamp group, through said fourth N-type driving module.

2. Said driving device for an LED, according to claim 1, wherein, said LED-lamp bunch and LED-lamp group include at least one LED or HV LED, respectively.

3. Said driving device for an LED, according to claim 1, wherein, said first N-type driving module includes a first NMOS FET, a first resistor, a first comparator and a second comparator; a drain electrode of said first NMOS FET connects to the cathode of the first LED-lamp group and the anode of the second LED-lamp group; a gate electrode of said first NMOS FET connects to the logic controller; a source electrode of said first NMOS FET gets grounded through the first resistor, while it also connects to in-phase input ends of both the first comparator and the second comparator; an inverting input end of said first comparator connects to a first reference voltage, and an output end connects to the logic controller; the inverting input end of said second comparator connects to a second reference voltage, and the output end connects to the logic controller;

wherein said second N-type driving module includes a second NMOS FET, a second resistor, a third comparator and a fourth comparator; the drain electrode of said second NMOS FET connects to the cathode of the second LED-lamp group and the anode of the third LED-lamp group; the gate electrode of said second NMOS FET connects to the logic controller; the source electrode of said second NMOS FET gets grounded through the second resistor, while it also connects to the in-phase input ends of both the third and fourth comparators; the inverting input end of said third comparator connects to the first reference voltage, and the output end connects to the logic controller; the inverting end of said fourth comparator connects to the second reference voltage, while the output end connects to the logic controller;

wherein said third N-type driving module includes a third NMOS FET, a third resistor, a fifth comparator and a sixth comparator; the drain electrode of said third NMOS FET connects to the cathode of the third LED-lamp group and the anode of the fourth LED-lamp group; the gate electrode of said third NMOS FET connects to the logic controller; the source electrode of said third NMOS FET gets grounded through the third resistor, while it also connects to the in-phase input ends of both the fifth comparator and the sixth comparator; the inverting input end of said fifth comparator connects to the first reference voltage, and the output end connects to the logic controller; the inverting input end of said sixth comparator connects to the second reference voltage, and the output end connects to the logic controller;

wherein said fourth N-type driving module includes a fourth NMOS FET, a fourth resistor, a seventh comparator, and an eighth comparator; the drain electrode of said fourth NMOS FET connects to the cathode of the fourth LED-lamp group; the gate electrode of the sad fourth NMOS FET connects to the logic controller; the source electrode of said fourth NMOS FET gets grounded through the fourth resistor, while it also connects to the in-phase input ends of both the seventh comparator and the eighth comparator; the inverting input end of said seventh comparator connects to the first reference voltage, and the output end connects to the logic controller; the inverting input end of said eighth comparator connects to the second reference voltage, and the output end connects to the logic controller;

wherein said first P-type switching module includes: a first PMOS FET, a fifth NMOS FET, a fifth resistor and a sixth resistor; the source electrode of said first PMOS FET connects to the anode of the first LED-lamp bunch; the drain electrode of said first PMOS FET connects to the cathode electrode of the first LED-lamp bunch; the gate electrode of said first PMOS FET connects to the drain electrode of the fifth NMOS FET, while it also connects to the anode of the first LED bunch and the positive output end of the bridge rectifier through the sixth resistor; the source electrode of the fifth NMOS FET gets grounded through the fifth resistor; and the gate electrode of the fifth NMOS FET connects to the logic controller;

wherein said second P-type switching module includes: a second PMOS FET, a sixth NMOS FET, a seventh resistor and an eighth resistor; the source electrode of said second PMOS FET connects to the anode of the second LED-lamp bunch and the cathode of the first LED-lamp bunch; the drain electrode of said second PMOS FET connects to the cathode electrode of the second LED-lamp bunch; the gate electrode of said second PMOS FET connects to the drain electrode of the sixth NMOS FET, while it also connects to the anode of the second LED-lamp bunch through the eighth resistor; the source electrode of said sixth NMOS FET gets grounded through the seventh resistor; and the gate electrode of the sixth NMOS FET connects to the logic controller.

4. Said driving device for an LED, according to claim 1, wherein, said first N-type driving module includes a first NPN triode, a first resistor, a first comparator and a second comparator; a collecting electrode of said first NPN triode connects to the cathode of the first LED-lamp group and the anode of the second LED-lamp group; a base electrode of said first NPN triode connects to the logic controller; an emitting electrode of said first NPN triode connects to the in-phase input ends of both the first comparator and the second comparator, while it also gets grounded through the first resistor; the inverting input end of said first comparator connects to the first reference voltage, and the output end connects to the logic controller; the inverting input end of said second comparator connects to the second reference voltage, and the output end connects to the logic controller;

wherein said second N-type driving module includes a second NPN triode, a second resistor, a third comparator and a fourth comparator; the collecting electrode of said second NPN triode connects to the cathode of the second LED-lamp group and the anode of the third LED-lamp group; the base electrode of said second NPN triode connects to the logic controller; the emitting electrode of said second NPN triode connects to the in-phase input ends of both the third comparator and the fourth comparator, while it also gets grounded through the second resistor; the inverting input end of said third comparator connects to the first reference voltage, and the output end connects to the logic controller; the inverting input end of said fourth comparator connects to the second reference voltage, and the output end connects to the logic controller;

wherein said third N-type driving module includes a third NPN triode, a third resistor, a fifth comparator and a sixth comparator; the collecting electrode of said third NPN triode connects to the cathode of the third LED-lamp group and the anode of the fourth LED-lamp group; the base electrode of said third NPN triode connects to the logic controller; the emitting electrode of said third NPN triode connects to the in-phase input ends of both the fifth comparator and the sixth comparator, while it also gets grounded through the third resistor; the inverting input end of said fifth comparator connects to the first reference voltage, and the output end connects to the logic controller; the inverting input end of said sixth comparator connects to the second reference voltage, and the output end connects to the logic controller;

wherein said fourth N-type driving module includes a fourth NPN triode, a fourth resistor, a seventh comparator and an eighth comparator; the collecting electrode of said fourth NPN triode connects to the cathode of the fourth LED-lamp group; the base electrode of said fourth NPN triode connects to the logic controller; the emitting electrode of said fourth NPN triode connects to the in-phase input ends of both the seventh comparator and the eighth comparator, while it also gets grounded through the fourth resistor; the inverting input end of said seventh comparator connects to the first reference voltage, and the output end connects to the logic controller; the inverting input end of said eighth comparator connects to the second reference voltage, and the output end connects to the logic controller;

wherein said first P-type switching module includes: a first PNP triode, a fifth NMOS FET, a fifth resistor and a sixth resistor; the emitting electrode of the first PNP triode connects to the anode of the first LED-lamp bunch; the collecting electrode of the first PNP triode connects to the cathode of the first LED-lamp bunch; the base electrode of said first PNP triode connects to the drain electrode of the fifth NMOS FET, while it also connects to the anode of the first LED-lamp bunch and the positive output end of the bridge rectifier through the sixth resistor; the source electrode of said fifth NMOS FET gets grounded through the fifth resistor; the gate electrode of said fifth NMOS FET connects to the logic controller;

wherein said second P-type switching module includes: a second PNP triode, a sixth NMOS FET, a seventh resistor and an eighth resistor; the emitting electrode of the second PNP triode connects to the anode of the second LED-lamp bunch and the cathode of the first LED-lamp bunch; the collecting electrode of the second PNP triode connects to the cathode of the second LED-lamp bunch; the base electrode of said second PNP triode connects to the drain electrode of the sixth NMOS FET, while it also connects to the anode of the second LED-lamp bunch through the eighth resistor; the source electrode of said sixth NMOS FET gets grounded through the seventh resistor; the gate electrode of said sixth NMOS FET connects to the logic controller.

5. Said driving device for an LED, according to claim 1, wherein, said first LED-lamp bunch, the second LED-lamp bunch, the first LED-lamp group, the second LED-lamp group, the third LED-lamp group and the fourth LED-lamp group are composed by a plurality of LEDs or a plurality of HV LEDs connecting in serial, respectively.

6. The driving device for an LED, according to claim 1, also includes: an overvoltage protection module, a thermal overload protection module, and a voltage regulator; said overvoltage protection module, applied for overvoltage protections, said thermal overload protection module, applied for overheating protections; said overvoltage protection module, thermal overload protection module and voltage regulator connect to the logic controller, respectively.

7. A driving method adopting the driving device for LED of claim 1 includes: an output voltage from a bridge rectifier shifts with time, and when a voltage magnitude is rising, the number of lighting LED increases accordingly; when the voltage magnitude is lowering, the number of lighting LED decreases accordingly;

when the magnitude of voltage is rising, when neither a LED-lamp bunch nor a LED-lamp group is lit-on, following the voltage rising, a N-type driving module controls the LED-lamp group to connect to the circuit; and following the voltage rising more, a P-type switching module controls the LED-lamp bunch to connect to the circuit;

when the magnitude of voltage is lowering, at the time when all the LED-lamp bunch and the LED-lamp group are lit-on: following the output voltage lowering, the P-type switching module control the LED-lamp bunch not connect to the circuit, and following the output voltage lowering more, the N-type switching module control the LED-lamp group not to connect to the circuit;

wherein said LED-lamp bunch includes a first LED-lamp bunch and a second LED-lamp bunch; said P-type switching module includes a first P-type switching module and a second P-type switching module; said LED-lamp group includes a first LED-lamp group, a second LED-lamp group, a third LED-lamp group and a fourth LED-lamp group; wherein said N-type driving module includes a first N-type driving module, a second N-type driving module, a third N-type driving module and a fourth N-type driving module;

when the voltage amplitude is in the increasing stage, for example, when neither of the first LED-lamp bunch, the second LED-lamp bunch, the first LED-lamp group, the second LED-lamp group, the third LED-lamp group nor the fourth LED-lamp group is lit on, following the output voltage rising, the first N-type driving module controls the first LED-lamp group to light on, following the output voltage keeping rising, the first P-type switching module controls the first LED-lamp bunch to light on; the voltage keeps rising, and the second P-type switching module controls the second LED-lamp bunch to light on now the first LED bunch, the second LED bunch and the first LED group are lit-on; following the voltage keeping rising, the first LED-lamp bunch and the second LED-lamp bunch get light off, the second N-type driving module controls the second LED-lamp group light on, now the first LED lamp group and the second LED-lamp group are lit-on; following the voltage keeping rising, the first LED-lamp bunch lights on, now the first LED-lamp group, the second LED-lamp group and the first LED-lamp bunch are lit-on; following the voltage keeping rising, the second LED-lamp bunch lights on, now the first LED-lamp group, the second LED-lamp group, the first LED-lamp bunch and the second LED-lamp bunch are lit-on; following the voltage keeping rising, the first LED-lamp bunch and the second LED-lamp bunch light off, while the third LED-lamp group lights on; and so on, until all the LED-lamp bunches and LED-lamp groups are lit-on;

when the voltage amplitude is in the decreasing stage, for example, when all of the first LED-lamp bunch, the second LED-lamp bunch, the first LED-lamp group, the second LED-lamp group, the third LED-lamp group and the fourth LED-lamp group are lit on, following the output voltage lowering, the second P-type switching module controls the second LED-lamp bunch light off, following the output voltage keeping lowering, the first P-type switching module controls the first LED-lamp bunch light off, now the first LED-lamp group, the second LED-lamp group, the third LED-lamp group and the fourth LED-lamp are all lit on; voltage keeps lowering, the fourth N-type driving module controls the fourth LED-lamp group light off, now the first LED-lamp bunch and the second LED-lamp bunch are lit on; voltage keeps lowering, the second P-type switching module controls the second LED-lamp bunch light off; following the output voltage keeping lowering, the first P-type switching module controls the first LED-lamp bunch light off, now the first LED lamp group, the second LED-lamp group and the third LED-lamp group are lit-on; and so on, until all the LED-lamp bunches and LED-lamp groups are lit-off.

* * * * *